United States Patent [11] 3,625,520

[72] Inventor Alan W. Say
Ilford, Essex, England
[21] Appl. No. 839,831
[22] Filed July 8, 1969
[45] Patented Dec. 7, 1971
[73] Assignee The Plessey Company Limited
Ilford, England

[54] GRAMOPHONE RECORD PLAYERS
3 Claims, 4 Drawing Figs.

[52] U.S. Cl. .......... 274/9 R, 274/1 L, 274/15 R, 274/23
[51] Int. Cl. .......... G11b 3/00
[50] Field of Search .......... 274/1, 9, 15, 10, 23

[56] References Cited

UNITED STATES PATENTS

| | | | |
|---|---|---|---|
| 3,049,354 | 8/1962 | Guest .......... | 274/1 L |
| 2,616,705 | 11/1952 | Leonard .......... | 274/10 |
| 2,698,182 | 12/1954 | Mullaney et al. .......... | 274/10 |
| 3,163,429 | 12/1964 | Scalera .......... | 274/23 |
| 3,425,703 | 2/1969 | Nanz et al. .......... | 274/15 |

FOREIGN PATENTS

| | | | |
|---|---|---|---|
| 715,141 | 9/1954 | Great Britain .......... | 274/1 L |

*Primary Examiner*—Harry N. Haroian
*Attorney*—Blum, Moscovitz, Friedman & Kaplan

ABSTRACT: A record player has a flexible arm associated with the tone arm which can be selectively interposed between an adjusting screw and a pivot structure for changing the relation between the tone arm which is suitable for playing 7 inch, 10 inch or 12 inch records to one suitable for playing 3⅞ inch diameter records.

GRAMOPHONE RECORD PLAYERS

This invention relates to disc gramophone record players. In the past there have been in general three common sizes of record in use for domestic purposes, namely 12 inch diameter, 10 inch diameter and 7 inch diameter records and the apparatus for playing them has been designed accordingly.

There is now becoming available however a 3⅞ inch diameter record primarily intended for playing on portable record reproducers designed specifically for playing this size of record and the principal object of the present invention is to facilitate the playing of such small records on conventional record playing apparatus. The principal difficulty in doing this arises from the fact that most of such apparatus is provided with an automatic trip which responds to movement of the pickup as it swings in the runoff groove near the center of the record, but whereas with the 7 inch, 10 inch and 12 inch diameter records operation of the autotrip can be inhibited until the pickup reaches a position towards the end of the modulated part of the groove, it is impossible to make this position common for these records and for the 3⅞ inch diameter record since the diameter of the latter is only of the same order as that of the runoff groove of the larger records. In fact the radius at which tripping is initiated, in the case of a velocity trip, is usually chosen to be about 2½ inch. It will be apparent therefore that any attempt to position the pickup for starting play on a record of anything less than 5 inch diameter will almost certainly cause tripping to take place.

According to the invention therefore, a record player is provided with selectable means for changing the relation between the tone arm and the autotrip mechanism from one which is suitable for playing 7 inch, 10 inch or 12 inch diameter records to one which is suitable for playing records having a diameter less than 5 inches. This can be carried out in various ways but in a preferred arrangement it is effected by changing the angle between the tone arm and a pivot structure by which it is supported for swinging over the surface of a record to be played, the pivot structure being associated with a striker which cooperates with the autotrip mechanism.

In some of the conventional constructions of automatic or semiautomatic record players it is common to provide a spring-loaded connection between the pickup pivot structure and the tone arm so that, for example, forcible manual movement of the tone arm from its rest position across the record, whilst still in driving connection with the automatic pickup positioning system, merely stresses the spring and does not damage the mechanism or put it out of adjustment. Such a construction usually includes an adjustment for set down position but in any event there is normally an abutment on the pickup pivot structure which is held in engagement with a corresponding abutment associated with the tone arm itself by a spring.

According to a feature of the invention one of the abutments is adjustable to provide the desired change of pickup position and this abutment may be constituted by a two-position cam which may be moulded in one piece with its shaft out of plastics material.

According to another aspect of the invention there is provided an auxiliary device including a spacer which can be interposed between the respective abutments of the tone arm and the tone arm pivot structure so that when so interposed the position of the pickup arm is adjusted inwardly so as to permit its cooperation with a record smaller than 5 inches in diameter without bringing into operation the automatic trip mechanism at positions of the pickup near the setdown position for such a record.

It will be appreciated that the physical adjustment of the tone arm in relation to its pivot structure can have different effects according to the extent of the playing area of the small-sized record. Thus it will be possible to choose between the following conditions:

a. Automatic setdown on 3⅞inch records (assuming the machine is an autochanger) but no tripping,
b. Manual setdown and automatic tripping,
c. Manual setdown but no tripping.

An alternative arrangement for effecting the necessary adjustment comprises a bistable connection between the tone arm and the pivot structure. This bistable connection is preferably arranged below the baseplate of the player so that if desired it can be set to either of its two positions by the movement of a selector lever, which however will leave the connection free to rotate with the pivot structure whenever the selector lever is not being moved.

According to another aspect of the invention the relation between the tone arm and the autotrip mechanism is made changeable by selectively changing the effective length of an element in the autotrip mechanism.

The auxiliary device may be an entirely separate piece arranged for the user to place in position when required or it may be a piece designed for building into an existing record changer and in one form of the invention it is made of springy material, such as nylon, and is arranged to be moved between an inoperative position and a position where a part of it serves as a spacer between the two abutments referred to above.

In order that the invention may be clearly understood an example of the above mentioned form of the invention will now be described with reference to the accompanying drawings in which, FIG. 1 is a schematic plan view of part of an automatic record changer in which the pickup arm is shown partly in section;

Figure 1:
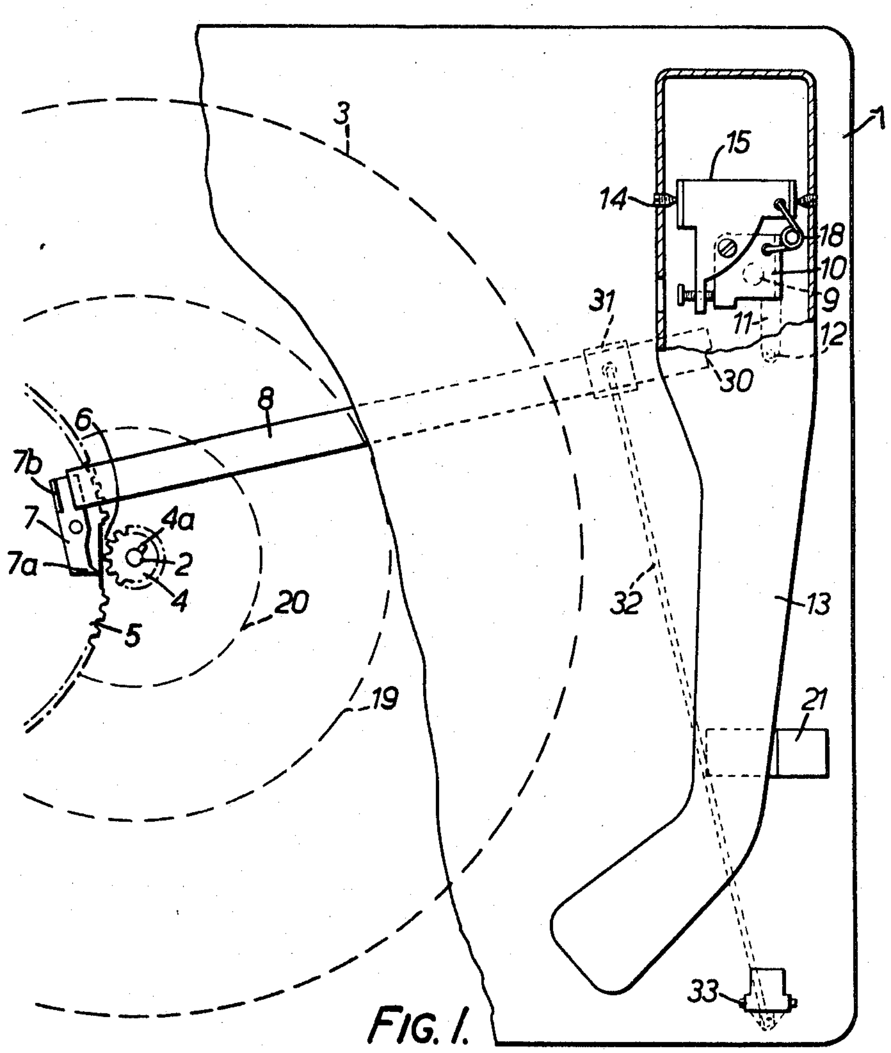

Referring first to FIG. 1 which shows the relevant parts of a conventional automatic record changer, a baseplate 1 carries in bearings (not shown) a spindle 2 for a turntable having a diameter of approximately 12 inches indicated by the dotted line 3. The spindle 2 carries a pinion 4 for cooperation with the teeth of a cam gear 5 which imparts the necessary motions to the various elements of the record changer including the pickup by means of one or more cam profiles (not shown).

The movement of the cam gear 5 which is stationary during the playing of the record, during which time the pinion 4 rotates freely in the gap 6 in the teeth of the cam gear 5, is initiated by a pivoted starting pawl 7 which is movable to a position in which its tooth 7*a* cooperates with an abutment 4*a* on the pinion 4. This movement is occasioned by a sliding trip bar 8 striking a projection 7*b*, the sliding trip bar being moved by the movement inwards towards the center of the record of the tone arm.

The baseplate 1 also carries a vertical pivot shaft 9 which carries a pivot structure 10 above the baseplate 1. It also carries below the baseplate 1 a lever 11 which carries a pin 12 arranged to strike the end of the sliding trip bar 8 when the pickup approaches the runoff groove of a record. The tone arm 13 is arranged to pivot also about a horizontal axis by means of pivot screw 14 which engage suitable holes in a bracket 15 which is mounted on the pivot structure 10 by means of a vertical pivot screw 16. Between the bracket 15 and the pivot structure 10 there is interposed a nylon washer surrounding the pivot screw 16 so as to prevent chatter. This nylon washer is not shown.

The bracket 15 is provided with an abutment in the form of an adjusting screw 17 the end of which bears against a corresponding abutment on the edge of the pivot structure 10 and these are urged together by the action of the spring 18.

The size of a 7 inch diameter record is indicated by the dotted line 19 and the spacing between the pin 12 and the trip bar 8 is such that the pickup arm can be moved inwardly automatically as a result of mechanism (not shown) deriving its motion from the cam gear 5 and causing this pivot structure 10 to rotate so as to cause the stylus of the pickup to be set down at the beginning of the playing grooves of the 7 inch record, or the pickup arm 13 can be moved manually, if the automatic mechanism is disconnected, to a position corresponding to the innermost land of a multiland 7 inch record before the trip bar 8 is effective to cause the pawl 7 to engage with the abutment *4a*.

However, the size of a 3⅞ inch diameter record, which is indicated by the dotted line 20, is such that the setdown position of the pickup is nearer the center than the position corresponding to the innermost land of a multiland 7 inch record so that an attempt to move the pickup to a position corresponding to the starting groove of a 3⅞ inch record would result in the trip mechanism being operated and the pickup immediately moved back to the rest position in which it is carried by the rest 21.

Figure 2:
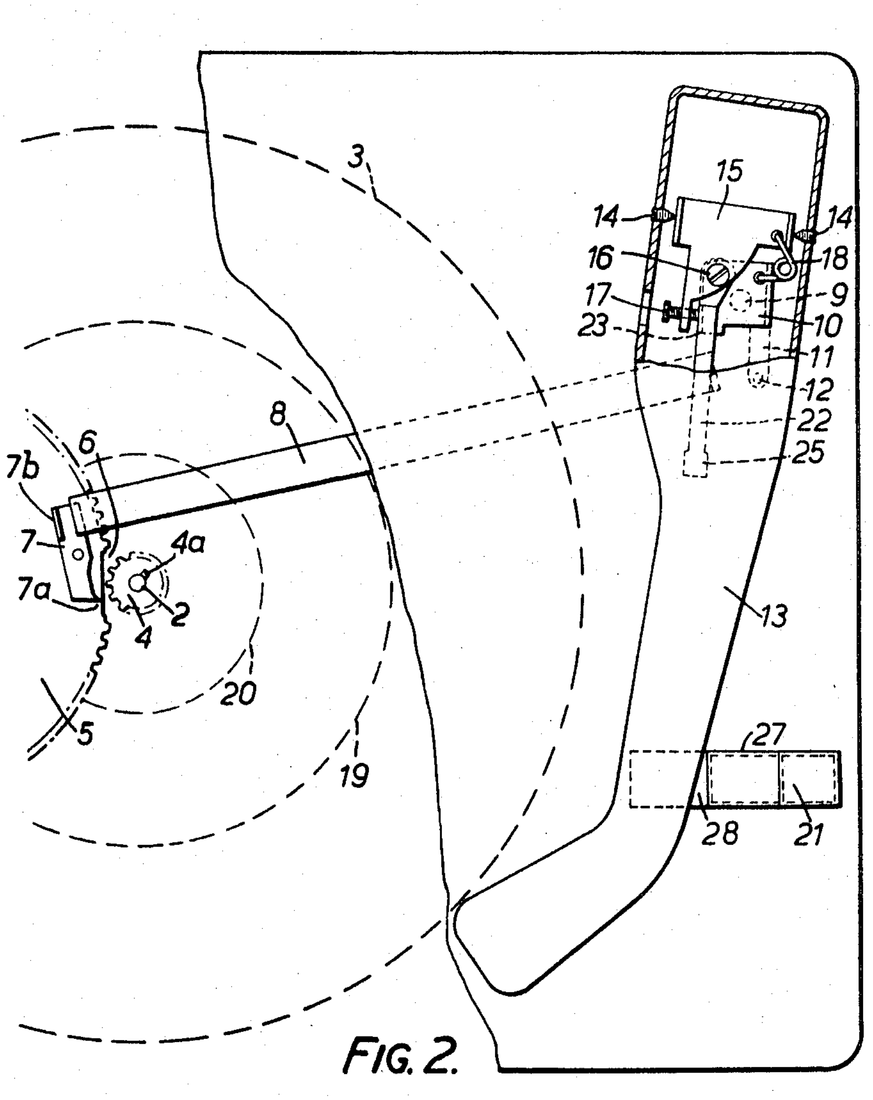
FIG. 2 is a similar view of FIG. 1 in which a device according to the invention has been included.
Figure 3:
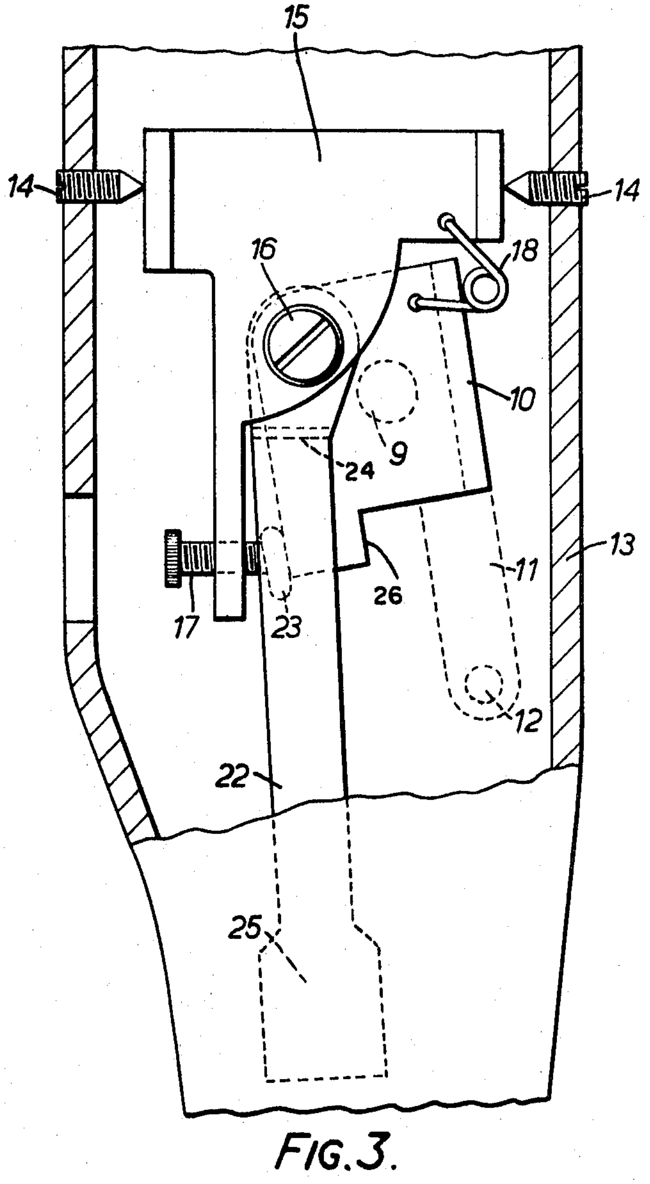
FIG. 3 is a greatly enlarged view of the pivot end of the pickup arm shown in FIG. 2; and, FIG. 4 is a fragmentary view of another device according to the invention.

Referring now to FIG. 2 and to FIG. 3 which shows an enlargement of part of FIG. 2, most of the parts are identical to the parts shown in FIG. 1 and have therefore been given the same numbers and will not be described again. In place of the nylon washer referred to in connection with FIG. 1 there is placed around the screw 16 a mainly flat lever 22 which thus fulfills the function previously served by the washer and in addition has a downwardly projecting spacer portion 23. The spacer is shown interposed between the abutment formed by the end of the adjusting screw 17 and the side face of the pivot structure 10 so that the pickup arm occupies the rest position shown in FIG. 2. Upon moving the pickup arm therefore into the position for commencing play of a 3⅞ inch diameter record the operation of the trip bar 8 will not commence until after this position has been passed, since the pin 12 still has the same distance to travel before striking the trip bar 8 while its angular position in relation to that of the pickup arm has been changed by the interposition of the spacer portion 23.

In order to be able to disengage the spacer portion 23 when larger records are to be played the lever 22 is provided with a neck portion 24 in order that it should be easily bendable at a predetermined region and is provided at its extremity with a handle portion 25 so that the lever can be lifted to bring the spacer portion 23 clear of the two abutments. The lever 22 can then be moved sideways so that the spacer portion drops behind the edge 26 and the handle 25 projects beyond the edge of the pickup so that a visible indication is given of the position of the spacer.

In order to provide a suitable rest for the tone arm in its rest position when adjusted for playing 3⅞ inch diameter records the rest 21 is provided with a shroud 27 which can be molded of plastic material so as to fit over the rest 21 and has a projection ledge 28 to form a temporary extension of the operative surface of the rest 21. Whether or not the shroud 27 can be left permanently in position depends on whether the design of the record player still leaves sufficient room for the manipulation when the pickup is in this position of the largest diameter record for which the apparatus is designed.

An alternative arrangement for altering the trip radius is shown in FIG. 1 of the drawings. In this arrangement the trip bar 8 has a notch 30 in the end which is struck by the pin 12. In normal operation the pin 12 is arranged to strike that portion of the end of the trip bar 8 which is not notched.

When however it is desired to play a 3⅞ inch diameter record and to alter the trip radius to a suitably smaller radius the trip bar 8 is moved so that the pin 12 enters the notch 30 and thus only moves the trip bar 8 after the pickup has travelled further in towards the center of the turntable. This is accomplished by moving a saddle 31, in which the trip bar 8 slides, by means of a rod 32, operated by a lever 33 projecting through the baseplate 1.

Figure 4:
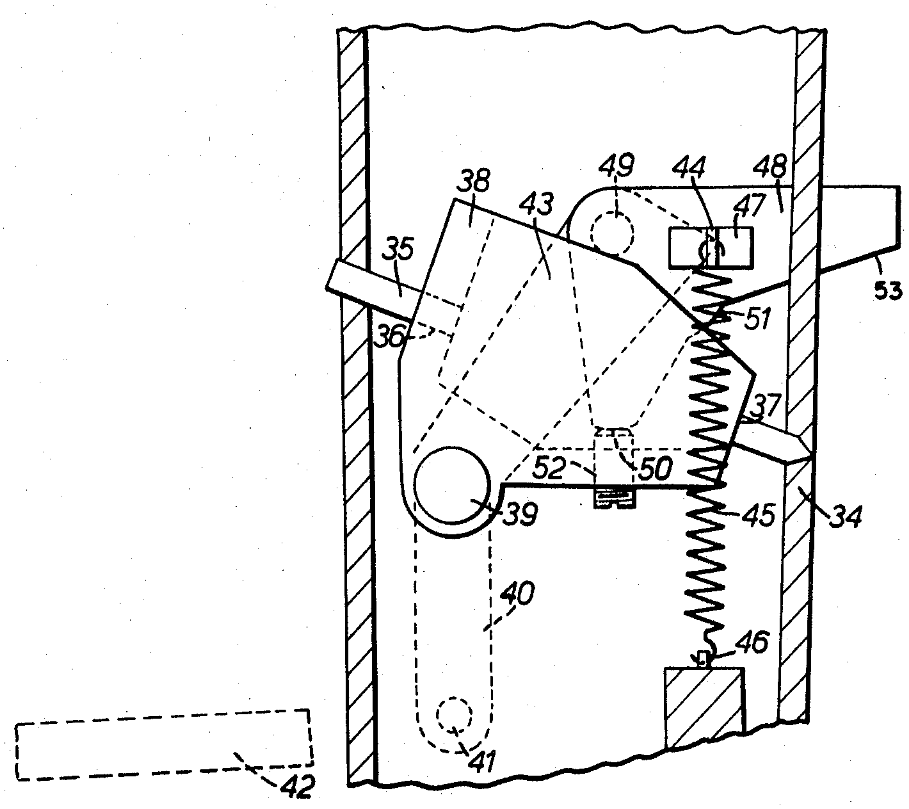

Referring now to FIG. 4 of the drawings which shows yet another device according to the invention for varying the positional relationship between the tone or pickup arm and an element of an autotrip mechanism in order to provide for the playing of a 3⅞ inch diameter records, the pivot end of the tone arm body is shown fragmentarily at 34. Pivoting of the pickup arm about a horizontal axis is afforded by means of a horizontally disposed pivot pin 35 which extends between the side walls of the pickup arm body and which passes through holes 36 and 37 in pivot bracket 38 which is pivotally mounted on a vertical pivot shaft 39 which extends through the baseplate of the player and which has fixedly attached to its lower end below the baseplate a lever 40 which carries a pin 41 arranged to strike the end of a sliding trip bar 42 of an autotrip mechanism when the pickup approaches the runoff groove of a record. This autotrip mechanism is substantially the same as that shown more fully in FIG. 2. Mounted below the pivot bracket 38 and keyed on to the vertical pivot shaft 39 is a pivot lever arm 43 forming part of a pivot structure for the pickup arm and having an upstanding lug 44 to which is attached one end of a coiled tension spring 45 anchored at its other end 46 to the underside of the pickup arm body. The lug 44 extends through a slot 47 in a cam selector 48 which pivots at 49 on the pivot lever 43. The cam selector 48 has two convex spaced cam surfaces at 50 and 51 which are located at different radii from the center of pivot 49. In the position of the selector 48 as shown the cam surface 50 is urged into engagement with an adjuster screw 52 threaded into bracket 38 for adjusting the set down of the pickup arm, by the tension spring 45 since the selector 48 is carried by the pivot lever 43 on which the spring 45 acts. Thus the lever 40 which is attached to the pivot shaft 39 to which the pivot lever is keyed takes up a certain angular position relative to the axis of the pickup arm. With the cam selector 48 in the position shown the pickup arm is arranged for playing records of 3⅞ inches diameter and the pin 41 will strike the end of the trip arm 42 when the pickup arm reaches the runoff groove of such records.

If now it is required to play records of 7, 10 or 12-inch diameter the cam selector 48 is turned in a clockwise direction about its pivot 49 by applying appropriate pressure to the projecting part 53 until the cam surface 51 engages the adjuster grub screw 52. The reduction in radius of the cam surface 51 from the pivot 49 which is taken up by the action of spring 45 produces relative rotational movement between the tone arm and the pin 39 so that the tone arm moves counterclockwise as viewed in the drawing thereby to vary the angle between the lever 40 and the axis of the pickup arm. By so doing the pin 41 will strike the trip bar 42 to effect tripping of the player at a larger radius of the stylus from the center of the record.

What I claim is:

1. A gramophone record player comprising a baseplate, a turntable rotatably mounted on said baseplate, drive means for causing the turntable to be rotated, a pickup arm pivotally mounted at one end on said baseplate, the other end of the pickup arm being movable over the turntable, and an autotrip mechanism operable on said drive means in response to movement of the pickup arm towards the center of the turntable, the autotrip mechanism including a longitudinally displaceable trip element carried by said baseplate, a striker element carried by the pickup arm and movable therewith for effecting actuation of the trip element, and actuating means for causing the trip element to be moved in a transverse direction whereby the effective length of the trip element may be varied.

2. A gramophone record player according to claim 1, in which the trip element is provided with a cutout in an end thereof, the actuating means being effective for causing the cutout to be moved into and out of the path of the striker element for the purpose of varying the effective length of the trip element.

3. A gramophone record player according to claim 2, comprising a saddle member in which the trip element is slidably supported, and a selecting device connected to the saddle member for causing the saddle member to be moved in a direction transverse to the direction of sliding movement of the trip element dependent upon the size of record to be player on said record player.

* * * * *